(12) United States Patent
Tarraf et al.

(10) Patent No.: US 9,369,886 B2
(45) Date of Patent: Jun. 14, 2016

(54) METHODS AND APPARATUS FOR IMPLEMENTING A SELF OPTIMIZING-ORGANIZING NETWORK MANAGER

(75) Inventors: Osama Tarraf, Ashburn, VA (US); Mustafa Emin Sahin, Ashburn, VA (US); Arif Ansari, Bethesda, MD (US)

(73) Assignee: Viavi Solutions Inc., Milpitas, CA (US)

( * ) Notice: Subject to any disclaimer, the term of this patent is extended or adjusted under 35 U.S.C. 154(b) by 404 days.

(21) Appl. No.: 13/606,528

(22) Filed: Sep. 7, 2012

(65) Prior Publication Data

US 2013/0242736 A1    Sep. 19, 2013

Related U.S. Application Data

(60) Provisional application No. 61/532,850, filed on Sep. 9, 2011.

(51) Int. Cl.
| | |
|---|---|
| *H04L 12/26* | (2006.01) |
| *H04W 24/02* | (2009.01) |
| *H04W 16/18* | (2009.01) |

(52) U.S. Cl.
CPC .................................. *H04W 24/02* (2013.01)

(58) Field of Classification Search
CPC ....... H04W 24/02; H04W 3/00; H04W 84/18; H04W 24/08; H04L 41/0823; H04L 1/00; H04L 43/08
USPC .................................. 370/235, 328; 455/418
See application file for complete search history.

(56) References Cited

U.S. PATENT DOCUMENTS

| | | |
|---|---|---|
| 5,425,051 A | 6/1995 | Mahany |
| 5,796,722 A | 8/1998 | Kotzin et al. |
| 5,802,144 A | 9/1998 | Laird et al. |
| 5,859,839 A | 1/1999 | Ahlenius et al. |
| 5,873,040 A | 2/1999 | Dunn et al. |

(Continued)

FOREIGN PATENT DOCUMENTS

| | | |
|---|---|---|
| EP | 2129175 | 12/2010 |
| EP | 1952657 | 8/2011 |

(Continued)

OTHER PUBLICATIONS

International Search Report and Written Opinion mailed Jun. 18, 2010 for PCT Application No. PCT/US2010/31603.

(Continued)

*Primary Examiner* — Khaled Kassim
*Assistant Examiner* — Berhanu Belete
(74) *Attorney, Agent, or Firm* — Harrity & Harrity, LLP

(57) ABSTRACT

In some embodiments, an apparatus includes a management module implemented in at least one of a memory or a processing device. The management module is configured to receive a signal associated with a value of a performance indicator that a first process module is configured to optimize using a metric. The management module is configured to optimize a value associated with the metric based at least in part on the value of the performance indicator that the first process module is configured to optimize and a value of a performance indicator that a second process module is configured to optimize using the metric. The management module is configured to send a signal to the first process module such that the first process module modifies a value of the metric based on the value associated with the metric.

20 Claims, 9 Drawing Sheets

(56) References Cited

U.S. PATENT DOCUMENTS

| | | | |
|---|---|---|---|
| 6,051,408 A | 4/2000 | Bartsch et al. | |
| 6,069,871 A | 5/2000 | Sharma et al. | |
| 6,115,393 A | 9/2000 | Engel et al. | |
| 6,138,016 A | 10/2000 | Kulkarni et al. | |
| 6,141,565 A | 10/2000 | Feuerstein et al. | |
| 6,253,077 B1 | 6/2001 | Burt et al. | |
| 6,304,556 B1 | 10/2001 | Haas | |
| 6,400,335 B1 | 6/2002 | Weaver et al. | |
| 6,545,690 B1 | 4/2003 | Hernandez | |
| 6,549,529 B1 | 4/2003 | Drabeck et al. | |
| 6,574,477 B1 | 6/2003 | Rathunde | |
| 6,729,929 B1 | 5/2004 | Sayers et al. | |
| 6,829,491 B1 | 12/2004 | Yea et al. | |
| 6,842,431 B2 | 1/2005 | Clarkson et al. | |
| 6,937,863 B1 | 8/2005 | Gordon et al. | |
| 6,985,704 B2 | 1/2006 | Yang et al. | |
| 6,999,766 B1 | 2/2006 | Padovani | |
| 7,006,805 B1 | 2/2006 | Sorrells et al. | |
| 7,016,685 B1 | 3/2006 | Cain et al. | |
| 7,149,478 B2 | 12/2006 | Hawe | |
| 7,221,928 B2 | 5/2007 | Laird et al. | |
| 7,260,415 B1 | 8/2007 | Oh | |
| 7,313,402 B1 | 12/2007 | Rahman | |
| 7,323,945 B2 | 1/2008 | Cyr et al. | |
| 7,349,765 B2 | 3/2008 | Reaume et al. | |
| 7,353,160 B2 | 4/2008 | Voigt | |
| 7,385,503 B1 | 6/2008 | Wells et al. | |
| 7,461,037 B2 | 12/2008 | Hätönen et al. | |
| 7,477,920 B2 | 1/2009 | Scheinert et al. | |
| 7,505,010 B2 | 3/2009 | Franzon et al. | |
| 7,519,860 B2 | 4/2009 | Hätönen et al. | |
| 7,529,215 B2 | 5/2009 | Osterling | |
| 7,561,876 B2 | 7/2009 | Chiou et al. | |
| 7,567,822 B2 | 7/2009 | Hart et al. | |
| 7,577,103 B2 | 8/2009 | Diaz et al. | |
| 7,590,589 B2 | 9/2009 | Hoffberg | |
| 7,606,287 B2 | 10/2009 | Mahany | |
| 7,609,747 B2 | 10/2009 | Mahany | |
| 7,623,455 B2 | 11/2009 | Hilla et al. | |
| 7,653,407 B2 | 1/2010 | Backes et al. | |
| 7,663,555 B2 | 2/2010 | Caimi et al. | |
| 7,747,712 B2 | 6/2010 | Petersen et al. | |
| 7,768,968 B2 | 8/2010 | Plehn et al. | |
| 7,827,268 B2 | 11/2010 | Monier et al. | |
| 7,839,882 B2 | 11/2010 | Soliman | |
| 7,877,095 B2 | 1/2011 | Hubner et al. | |
| 7,877,108 B2 | 1/2011 | Wengerter et al. | |
| 7,899,890 B2 | 3/2011 | Petersen et al. | |
| 7,904,080 B2 | 3/2011 | Atkins et al. | |
| 7,929,457 B2 * | 4/2011 | Healy et al. | 370/252 |
| 7,941,136 B2 * | 5/2011 | Reed | H04L 41/0816 455/423 |
| 7,969,896 B2 | 6/2011 | Sheinfeld et al. | |
| 8,010,469 B2 | 8/2011 | Kapoor et al. | |
| 8,018,925 B2 | 9/2011 | Noriega | |
| 8,023,529 B2 | 9/2011 | Oh et al. | |
| 8,032,131 B2 | 10/2011 | Dobson et al. | |
| 8,045,996 B2 | 10/2011 | Brunner et al. | |
| 8,050,191 B2 * | 11/2011 | Tirpak | G06Q 10/00 370/252 |
| 8,117,294 B2 | 2/2012 | Pollakowski et al. | |
| 8,144,619 B2 | 3/2012 | Hoffberg | |
| 8,159,932 B1 | 4/2012 | Hart et al. | |
| 8,185,124 B2 | 5/2012 | Antic et al. | |
| 8,208,924 B2 | 6/2012 | Han et al. | |
| 8,295,877 B2 | 10/2012 | Hui et al. | |
| 8,320,850 B1 | 11/2012 | Khlat | |
| 8,355,728 B2 | 1/2013 | Jung et al. | |
| 8,385,900 B2 | 2/2013 | Trigui | |
| 8,509,762 B2 | 8/2013 | Li et al. | |
| 8,626,075 B2 | 1/2014 | Turk et al. | |
| 8,665,835 B2 | 3/2014 | Hussein et al. | |
| 8,971,302 B2 * | 3/2015 | Lee | H04W 24/02 370/338 |
| 2002/0056066 A1 | 5/2002 | Gesbert et al. | |
| 2003/0100344 A1 | 5/2003 | Garmonev et al. | |
| 2003/0191856 A1 | 10/2003 | Lewis et al. | |
| 2003/0228857 A1 | 12/2003 | Maeki | |
| 2003/0229478 A1 | 12/2003 | Rappaport et al. | |
| 2004/0018839 A1 | 1/2004 | Andric et al. | |
| 2004/0042473 A1 | 3/2004 | Park et al. | |
| 2004/0117226 A1 | 6/2004 | Laiho et al. | |
| 2004/0196834 A1 | 10/2004 | Ofek et al. | |
| 2004/0229621 A1 | 11/2004 | Misra | |
| 2004/0248589 A1 | 12/2004 | Gwon et al. | |
| 2004/0266442 A1 * | 12/2004 | Flanagan | H04W 16/18 455/445 |
| 2005/0009531 A1 | 1/2005 | Lindquist et al. | |
| 2005/0054339 A1 | 3/2005 | Merritt | |
| 2005/0064844 A1 | 3/2005 | McAvoy | |
| 2005/0111630 A1 | 5/2005 | Potorny et al. | |
| 2005/0176440 A1 | 8/2005 | Sang et al. | |
| 2005/0243723 A1 | 11/2005 | Randriamsay | |
| 2005/0259571 A1 | 11/2005 | Battou | |
| 2005/0272444 A1 | 12/2005 | Heffield et al. | |
| 2005/0277444 A1 | 12/2005 | Rensburg et al. | |
| 2006/0083170 A1 | 4/2006 | Silva et al. | |
| 2006/0221886 A1 | 10/2006 | Rao | |
| 2006/0239224 A1 | 10/2006 | Borst et al. | |
| 2006/0246844 A1 | 11/2006 | Kroboth et al. | |
| 2007/0002765 A1 | 1/2007 | Kadaba et al. | |
| 2007/0021151 A1 | 1/2007 | Mori et al. | |
| 2007/0066298 A1 | 3/2007 | Hurst | |
| 2007/0087756 A1 | 4/2007 | Hoffberg | |
| 2007/0094729 A1 | 4/2007 | Hoefelmeyer et al. | |
| 2007/0123271 A1 | 5/2007 | Dickinson | |
| 2007/0129086 A1 | 6/2007 | Toone | |
| 2007/0147297 A1 | 6/2007 | Diaz et al. | |
| 2007/0195721 A1 | 8/2007 | Backes et al. | |
| 2007/0197215 A1 | 8/2007 | Ben-Yahuda et al. | |
| 2007/0218862 A1 | 9/2007 | Tatman et al. | |
| 2007/0248039 A1 | 10/2007 | Backes et al. | |
| 2008/0004078 A1 | 1/2008 | Barratt et al. | |
| 2008/0016198 A1 | 1/2008 | Johnston-Watt et al. | |
| 2008/0020801 A1 | 1/2008 | Fesas et al. | |
| 2008/0032677 A1 * | 2/2008 | Catovic | H04W 72/02 455/414.1 |
| 2008/0039089 A1 | 2/2008 | Berkman et al. | |
| 2008/0096566 A1 | 4/2008 | Brunner et al. | |
| 2008/0125142 A1 | 5/2008 | Chang-Hung | |
| 2008/0130790 A1 | 6/2008 | Forenza et al. | |
| 2008/0207195 A1 | 8/2008 | Ranta et al. | |
| 2008/0225714 A1 | 9/2008 | Denis | |
| 2008/0268833 A1 | 10/2008 | Huang et al. | |
| 2008/0311924 A1 | 12/2008 | Lucidarme | |
| 2009/0003236 A1 | 1/2009 | Aoyama et al. | |
| 2009/0003312 A1 | 1/2009 | Velazquez et al. | |
| 2009/0023477 A1 | 1/2009 | Staudte | |
| 2009/0036116 A1 | 2/2009 | Kim et al. | |
| 2009/0047968 A1 | 2/2009 | Gunnarsson et al. | |
| 2009/0075648 A1 * | 3/2009 | Reed | H04L 41/0816 455/424 |
| 2009/0075655 A1 | 3/2009 | Dobson et al. | |
| 2009/0112932 A1 | 4/2009 | Skierkowski et al. | |
| 2009/0131038 A1 | 5/2009 | MacNaughtan et al. | |
| 2009/0163223 A1 | 6/2009 | Casey | |
| 2009/0221297 A1 | 9/2009 | Wengerter et al. | |
| 2009/0227251 A1 * | 9/2009 | Lei | H04J 11/0069 455/425 |
| 2009/0227261 A1 | 9/2009 | Tiirola et al. | |
| 2009/0233625 A1 | 9/2009 | Ferguson | |
| 2009/0257353 A1 | 10/2009 | Song et al. | |
| 2009/0264130 A1 | 10/2009 | Catovic et al. | |
| 2009/0312022 A1 | 12/2009 | Viorel et al. | |
| 2009/0315736 A1 | 12/2009 | Reichl et al. | |
| 2009/0323530 A1 * | 12/2009 | Trigui | H04L 41/5025 370/235 |
| 2010/0002603 A1 | 1/2010 | Gupta et al. | |
| 2010/0008293 A1 | 1/2010 | Gupta et al. | |
| 2010/0029282 A1 | 2/2010 | Stamoulis et al. | |
| 2010/0046369 A1 | 2/2010 | Zhao et al. | |
| 2010/0075682 A1 | 3/2010 | del Rio-Romero | |
| 2010/0103911 A1 | 4/2010 | Ji | |
| 2010/0111013 A1 | 5/2010 | Chou | |

(56) References Cited

U.S. PATENT DOCUMENTS

| | | |
|---|---|---|
| 2010/0111047 A1 | 5/2010 | Yang et al. |
| 2010/0124934 A1 | 5/2010 | Mach |
| 2010/0130194 A1 | 5/2010 | Dickey |
| 2010/0149984 A1 | 6/2010 | Kapoor et al. |
| 2010/0151850 A1* | 6/2010 | Majmundar ............ H04L 69/32 455/423 |
| 2010/0159936 A1 | 6/2010 | Brisebois et al. |
| 2010/0169934 A1 | 7/2010 | Kennedy |
| 2010/0190488 A1 | 7/2010 | Jung et al. |
| 2010/0203881 A1 | 8/2010 | del Rio Romero et al. |
| 2010/0214939 A1 | 8/2010 | Ryan |
| 2010/0216453 A1 | 8/2010 | Kallin et al. |
| 2010/0216467 A1 | 8/2010 | Ryan et al. |
| 2010/0216477 A1 | 8/2010 | Ryan |
| 2010/0232318 A1 | 9/2010 | Sarkar |
| 2010/0235285 A1 | 9/2010 | Hoffberg |
| 2010/0254344 A1 | 10/2010 | Wei et al. |
| 2010/0267397 A1 | 10/2010 | Shen et al. |
| 2010/0278161 A1 | 11/2010 | Ore et al. |
| 2010/0284303 A1 | 11/2010 | Catovic et al. |
| 2010/0299419 A1 | 11/2010 | Ramankutty et al. |
| 2010/0302954 A1* | 12/2010 | Tirpak et al. .................. 370/252 |
| 2010/0303174 A1 | 12/2010 | Oh et al. |
| 2010/0309799 A1* | 12/2010 | Nunzi .................... H04L 41/044 370/252 |
| 2010/0311415 A1 | 12/2010 | Hamabe et al. |
| 2010/0311421 A1 | 12/2010 | Mach |
| 2010/0325267 A1* | 12/2010 | Mishra .................. H04L 41/069 709/224 |
| 2010/0327766 A1 | 12/2010 | Recker et al. |
| 2011/0009105 A1* | 1/2011 | Lee ....................... H01Q 9/0407 455/418 |
| 2011/0014925 A1 | 1/2011 | Antic et al. |
| 2011/0028144 A1 | 2/2011 | Catovic et al. |
| 2011/0034179 A1 | 2/2011 | David et al. |
| 2011/0044165 A1 | 2/2011 | Ni et al. |
| 2011/0045865 A1 | 2/2011 | Viering et al. |
| 2011/0059744 A1 | 3/2011 | Won et al. |
| 2011/0090820 A1* | 4/2011 | Hussein ................ H04W 24/02 370/255 |
| 2011/0092195 A1 | 4/2011 | Hussein et al. |
| 2011/0096687 A1 | 4/2011 | Dottling et al. |
| 2011/0096688 A1 | 4/2011 | Sachs et al. |
| 2011/0105139 A1 | 5/2011 | On |
| 2011/0111700 A1 | 5/2011 | Hackett |
| 2011/0130135 A1 | 6/2011 | Trigui |
| 2011/0130146 A1 | 6/2011 | Trigui |
| 2011/0136478 A1* | 6/2011 | Trigui .................... H04W 24/02 455/418 |
| 2011/0141972 A1 | 6/2011 | Oh et al. |
| 2011/0151881 A1 | 6/2011 | Chou et al. |
| 2011/0190016 A1 | 8/2011 | Hamabe et al. |
| 2011/0199985 A1 | 8/2011 | Cai et al. |
| 2011/0230222 A1 | 9/2011 | Reudink |
| 2011/0249558 A1* | 10/2011 | Raaf ..................... H04B 7/2606 370/237 |
| 2011/0252477 A1* | 10/2011 | Sridhar .................... H04L 12/14 726/24 |
| 2011/0280157 A1 | 11/2011 | Suerbaum |
| 2011/0294527 A1 | 12/2011 | Brueck et al. |
| 2011/0312335 A1 | 12/2011 | Liu et al. |
| 2012/0009912 A1 | 1/2012 | Wang et al. |
| 2012/0009938 A1 | 1/2012 | Liu et al. |
| 2012/0009948 A1 | 1/2012 | Powers et al. |
| 2012/0026918 A1 | 2/2012 | Won et al. |
| 2012/0026941 A1 | 2/2012 | Ahmad et al. |
| 2012/0028584 A1 | 2/2012 | Zhang et al. |
| 2012/0028664 A1 | 2/2012 | Zhang et al. |
| 2012/0034919 A1 | 2/2012 | Nakata et al. |
| 2012/0066377 A1 | 3/2012 | Li et al. |
| 2012/0087257 A1 | 4/2012 | Larsson et al. |
| 2012/0087269 A1 | 4/2012 | Hussein et al. |
| 2012/0147765 A1 | 6/2012 | Wigren |
| 2012/0147828 A1 | 6/2012 | Wigren |
| 2012/0170478 A1 | 7/2012 | Doettling et al. |
| 2012/0182874 A1 | 7/2012 | Siomina et al. |
| 2012/0214477 A1* | 8/2012 | Wieslawa ............... H04W 4/18 455/422.1 |
| 2012/0252479 A1 | 10/2012 | Morita et al. |
| 2012/0264470 A1 | 10/2012 | Bajj et al. |
| 2012/0270536 A1 | 10/2012 | Ratasuk et al. |
| 2012/0295609 A1 | 11/2012 | Li et al. |
| 2012/0327797 A1 | 12/2012 | Siomina et al. |
| 2013/0003548 A1* | 1/2013 | Sridhar ................. H04L 47/125 370/235 |
| 2013/0005297 A1* | 1/2013 | Sanders ................ G01S 13/765 455/406 |
| 2013/0028107 A1* | 1/2013 | Ho ........................ H04W 24/02 370/252 |
| 2013/0114464 A1 | 5/2013 | Tarraf et al. |
| 2013/0189991 A1* | 7/2013 | Rose ..................... H04W 16/18 455/436 |
| 2013/0217435 A1 | 8/2013 | Tarraf et al. |
| 2013/0229914 A1* | 9/2013 | Suerbaum ............. H04W 24/02 370/229 |
| 2013/0322395 A1 | 12/2013 | Kazmi et al. |
| 2015/0011197 A1 | 1/2015 | Tarraf et al. |

FOREIGN PATENT DOCUMENTS

| | | |
|---|---|---|
| WO | WO 2007/063426 A2 | 6/2007 |
| WO | WO 2010/121251 | 10/2010 |
| WO | WO 2010/132884 A1 | 11/2010 |
| WO | WO 2011/005524 A2 | 1/2011 |
| WO | WO 2011/046705 A1 | 4/2011 |
| WO | WO 2012/072445 | 6/2012 |
| WO | WO 2012/162070 | 11/2012 |
| WO | WO 2013/036793 | 3/2013 |
| WO | WO 2013/070900 | 5/2013 |

OTHER PUBLICATIONS

U.S. Office Action mailed Oct. 13, 2010 for U.S. Appl. No. 12/385,752, filed Apr. 17, 2009.
U.S. Office Action mailed May 5, 2011 for U.S. Appl. No. 12/385,752, filed Apr. 17, 2009.
International Search Report and Written Opinion mailed Nov. 24, 2010 for PCT Application No. PCT/US2010/050627.
International Search Report and Written Opinion mailed Nov. 15, 2010 for PCT Application No. PCT/US2010/048929.
U.S. Office Action mailed Dec. 22, 2011 for U.S. Appl. No. 12/718,189, filed Mar. 5, 2010.
U.S. Office Action mailed Dec. 29, 2011 for U.S. Appl. No. 12/634,057, filed Dec. 9, 2009.
International Search Report and Written Opinion mailed Nov. 3, 2010 for PCT Application No. PCT/US2010/048927.
Amirijoo et al., "Cell Outage Management in LTE Networks," Cost 2100 TD(9)941, Vienna, Austria, Sep. 28-30, 2009.
Mueller et al., "A Cell Outage Detection Algorithm Using Neighbor Cell List Reports" 2008.
U.S. Office Action mailed Feb. 27, 2012 for U.S. Appl. No. 12/385,752, filed Apr. 17, 2009.
U.S. Office Action mailed Jun. 6, 2012 for U.S. Appl. No. 12/634,057, filed Dec. 9, 2009.
U.S. Final Office Action mailed Jul. 13, 2012 for U.S. Appl. No. 12/385,752, filed Apr. 17, 2009.
U.S. Final Office Action mailed Aug. 29, 2012 for U.S. Appl. No. 12/718,189, filed Mar. 5, 2010.
International Search Report and Written Opinion mailed Nov. 5, 2012 for PCT Application No. PCT/US2012/054204.
"Self-Optimizing Networks: The Benefits of SON in LTE," 4G americas, Jul. 2011.
International Search Report and Written Opinion mailed Feb. 5, 2013 for PCT Application No. PCT/US2012/064131.
U.S. Office Action mailed Mar. 18, 2013 for U.S. Appl. No. 12/580,604, filed Oct. 16, 2009.
Lehtimaki et al., "A SOM Based Approach for Visualization of GSM Network Performance Data," Helsinki University of Technology, 2005.

(56) References Cited

OTHER PUBLICATIONS

Blume et al., "Energy Savings in Mobile Networks Based on Adaptation to Traffic Statistics," Bell Labs Technical Journal 15(2), 77-94 (2010) © 2010 Alcatel-Lucent.
International Search Report and Written Opinion for International Application No. PCT/US2012/038243, mailed Aug. 17, 2012.
Office Action for U.S. Appl. No. 13/670,830, mailed Jan. 5, 2015.
International Search Report and Written Opinion for International Application No. PCT/US2013/026102, mailed Apr. 29, 2013.
Office Action for U.S. Appl. No. 13/273,354, mailed Apr. 16, 2013.
Office Action for U.S. Appl. No. 12/718,189, mailed Jan. 16, 2014.
Office Action for U.S. Appl. No. 12/718,189, mailed Jul. 31, 2014.
Office Action for U.S. Appl. No. 12/580,604, mailed Dec. 3, 2012.
Extended European Search Report for European Patent Application No. 12829986.4, mailed Jun. 2, 2015.
Sater, et al., "Self-Optimizing Networks: The Benefits of SON in LTE." (Jul. 2011). 4G Americas.
Feng, Sujuan, and Eiko Seidel. "Self-organizing networks (SON) in 3GPP long term evolution." Nomor Research GmbH, Munich, Germany (2008).

* cited by examiner

1100

```
Receive a signal associated with a value of a performance indicator
that a first process module is configured to optimize using a first
metric.
1102
```

```
Optimize a value associated with the first metric based on the value
of the performance indicator that the first process module is
configured to optimize, a value of a performance indicator that a
second process module is configured to optimize using the first
metric, and/or a value of a second metric used to optimize the
performance indicator that the first process module is configured to
optimize.
1104
```

```
Send a signal to the first process module including the value
associated with the first metric such that the first process module
modifies a value of the first metric based on the value associated
with the first metric.
1106
```

Receive a signal associated with a value of a performance indicator that a first process module is configured to optimize using a first metric and a second process module is configured to optimize using a second metric.
1202

↓

Optimize a value associated with the first metric and a value associated with the second metric based at least in part on the value of the performance indicator.
1204

↓

Send a signal to the first process module such that the first process module modifies a value of the first metric based on the value associated with the first metric.
1206

↓

Send a signal to the second process module such that the second process module modifies a value of the second metric based on the value associated with the second metric.
1208

FIG. 12 ately *# METHODS AND APPARATUS FOR IMPLEMENTING A SELF OPTIMIZING-ORGANIZING NETWORK MANAGER

CROSS-REFERENCE TO RELATED APPLICATIONS

This application claims priority to and the benefit of U.S. Provisional Patent Application No. 61/532,850, filed Sep. 9, 2011, and entitled "Self Optimizing-Organizing Network Manager," which is incorporated herein by reference in its entirety.

BACKGROUND

Some embodiments described herein relate generally to Self Optimizing Networks (SON), and, in particular, to methods and apparatus for managing simultaneous SON processes in a wireless network using a SON manager.

Some known wireless networks implement manual network optimization that typically consumes a large amount of human resources. As a lengthy process, the manual network optimization is typically performed only when needed or periodically with a long duration between actual implementations. As a result, the network or parts of the network will typically be non-optimized for relatively long periods of time. Thus, the network resource usage is typically not maximized, and the unused available network resources can result in significant revenue loss. Additionally, the quality of service is typically degraded, which affects the end users' overall satisfaction.

Accordingly, a need exists for methods and apparatus for implementing a SON manager that can automatically coordinate the work between different SON products or processes, to improve or maximize the overall network performance for the wireless networks.

SUMMARY

In some embodiments, an apparatus includes a management module implemented in at least one of a memory or a processing device. The management module is configured to receive a signal associated with a value of a performance indicator that a first process module is configured to optimize using a metric. The management module is configured to optimize a value associated with the metric based at least in part on the value of the performance indicator that the first process module is configured to optimize and a value of a performance indicator that a second process module is configured to optimize using the metric. The management module is configured to send a signal to the first process module such that the first process module modifies a value of the metric based on the value associated with the metric.

BRIEF DESCRIPTION OF THE DRAWINGS

FIG. 11 is a flow chart illustrating a method for optimizing a metric value associated with multiple optimization objectives, according to an embodiment.

FIG. 12 is a flow chart illustrating a method for optimizing multiple metric values associated with a single optimization objective, according to an embodiment.

DETAILED DESCRIPTION

In some embodiments, an apparatus includes a management module implemented in a memory or a processing device. The management module is configured to receive a signal associated with a value of a performance indicator that a first process module is configured to optimize using a first metric. The management module is configured to optimize a first value associated with the first metric based on the value of the performance indicator that the first process module is configured to optimize, and a first value of a performance indicator that a second process module is configured to optimize using the first metric. In some embodiments, the management module can be configured to optimize the first value associated with the first metric based on the value of the performance indicator that the first process module is configured to optimize, the first value of the performance indicator that the second process module is configured to optimize using the first metric, and a value of a second metric used to optimize the performance indicator that the first process module is configured to optimize. Furthermore, the management module is configured to send a signal to the first process module such that the first process module modifies a value of the first metric based on the first value associated with the first metric.

In some instances, the first value associated with the first metric can be a value to which to change the value of the first metric. The first metric or the second metric can be, for example, associated with a tilt of an antenna, or can be a number of cycles associated with the first process module. For other examples, the first process module or the second process module can be an antenna-based SON process module, a parameter-based SON process module, a load balancing SON process module or an interference reduction SON module.

As used herein, a module can be, for example, any assembly and/or set of operatively-coupled electrical components, and can include, for example, a memory, a processor, electrical traces, optical connectors, software (executing in hardware) and/or the like. As used herein, the singular forms "a," "an" and "the" include plural referents unless the context clearly dictates otherwise. Thus, for example, the term "a network optimization apparatus" is intended to mean a single physical device or a combination of physical devices.

Figure 1:
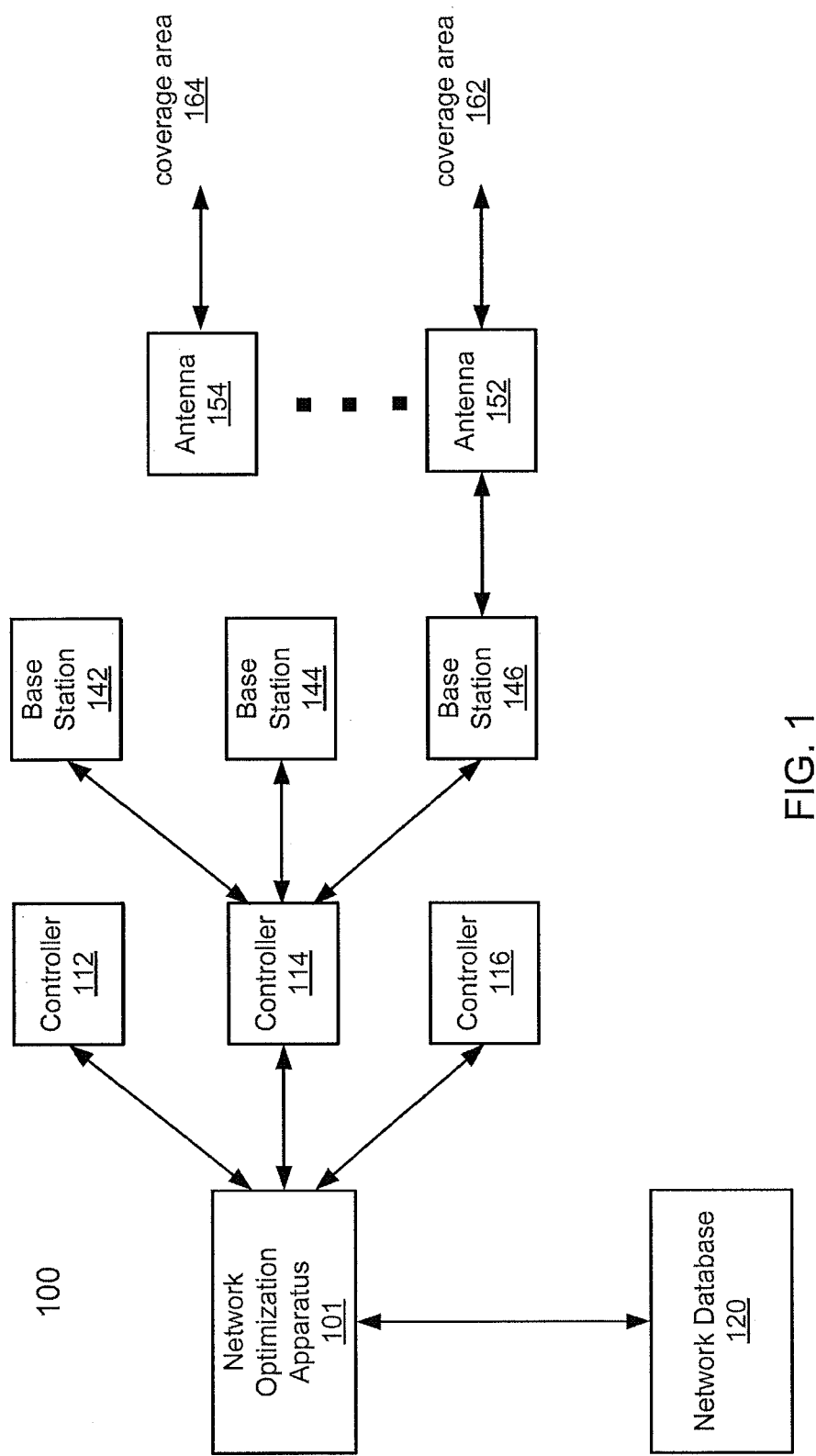
FIG. 1 is a schematic diagram that illustrates a wireless network configured to implement a SON manager, according to an embodiment.

FIG. 1 is a schematic diagram that illustrates a wireless network 100 configured to implement a SON manager, according to an embodiment. The wireless network 100 can be similar to the wireless networks shown and described in U.S. Patent Application Publication No. 2009/0323530, filed Apr. 17, 2009 and entitled "Dynamic Load Balancing," and U.S. Patent Application Publication No. 2011/0090820, filed Oct. 16, 2009 and entitled "Self-Optimizing Wireless Network," each of which is incorporated herein by reference in its entirety.

Specifically, the wireless network 100 can be any network that enables wireless communication devices (e.g., cellular phones, Wi-Fi enabled laptops, Bluetooth devices, mobile devices, etc.) to communicate with each other. In some embodiments, the wireless network 100 can be implemented and administered using a wireless transmission system such as radio frequency (RF) waves. For example, the wireless network 100 can be a cellular network that enables two cellular phones to communicate with each other. For another example, the wireless network 100 can be a Wi-Fi network that enables multiple Wi-Fi enabled laptops to be operatively connected. In some embodiments, the wireless network 100 can be at least a portion of, for example, a wireless local area network (WLAN), a wireless mesh network, a wireless metropolitan area network (MAN), a wireless wide area network (WAN), a mobile device network (e.g., a global system for mobile communications (GSM) network, a personal communications service (PCS) network), a radio access network (RAN), a long term evolution (LTE) network, a Universal Mobile Telecommunications System (UMTS) network and/or the like.

As shown in FIG. 1, the wireless network 100 includes a network optimization apparatus 101 operatively coupled to a network database 120. The network optimization apparatus 101 is also operatively coupled to and configured to manage one or more controllers (e.g., controllers 112, 114 and 116). Each controller (e.g., the controller 114) is operatively coupled to and configured to manage one or more base stations (e.g., base stations 142, 144 and 146). A controller can be any device that is capable of sending control signals (e.g., commands, instructions, requests, etc.) to the base station(s) controlled by that controller, thus managing operations of the base station(s). In some embodiments, a controller can be, for example, a server or similar computer device.

A base station 142, 144, 146 can be any device or infrastructure that can be wirelessly coupled to and communicate with one or more wireless communication devices (e.g., subscribers to the wireless network 100). Specifically, each base station 142, 144, 146 can be equipped with and configured to control one or more antennas (e.g., the antennas 152 and 154), which can be used to support data communications (e.g., transmit data to and/or receive data from) between the base station and the wireless communication devices that are distributed throughout a coverage area (i.e., sector) associated with that antenna. For example, the antenna 152 is used to support data communications between the base station 146 and wireless communication devices distributed within the coverage area 162; the antenna 154 is used to support data communications between a base station where the antenna 154 is located and wireless communication devices distributed within the coverage area 164. In some embodiments, a base station can be, for example, a cell site. In such embodiments, the coverage area associated with an antenna of that base station can be referred to as a cell.

In some embodiments, the connections between the network optimization apparatus 101 and the one or more controllers (e.g., the controllers 112, 114 and 116) and the network database 120 can include, for example, a wireless connection, a wired connection and/or a combination of wireless and wired connections. Similarly, the connections between each controller (e.g., the controller 114) and its associated base station(s) (e.g., the base stations 142, 144 and 146) can include, for example, a wireless connection, a wired connection and/or a combination of wireless and wired connections.

The network database 120 can be implemented in a memory or other storage device that is part of the network optimization apparatus 101 or another device operatively coupled to the network optimization apparatus 101. The network database 120 can be configured to receive and store information and/or data associated with the wireless network 100, such as network statistics and current network configurations of the wireless network 100. Furthermore, the network database 120 can be configured to provide the stored information and/or data to the network optimization apparatus 101. The information and/or data can be used at the network optimization apparatus 101 to assist in monitoring and optimizing SON processes operated in the wireless network 100, as described in details with respect to FIGS. 3-12. While shown in FIG. 1 as being located on a single device, in some embodiments, the functionality of the network database 120 can be distributed to multiple devices (e.g., multiple databases) across the wireless network 100.

The network statistics and configurations provided from the network database 120 to the network optimization apparatus 101 can include a set of values and/or indicators that can be used to determine the performance of the wireless network 100 in various aspects. The set of values and/or indicators can include, for example, Key Performance Indicators (KPIs), mobile level measurements, cell level measurements, system level measurements, network metrics, configuration metrics (e.g., system configuration metrics, device configuration metrics), power indicators, indications of a network alarm, and/or the like.

In some embodiments, the KPIs provided from the network database 120 to the network optimization apparatus 101 can include, for example, a dropped call rate (i.e., the ratio between failed calls and a total number of calls requested), a transmitted radio power, traffic statistical values associated with a cell, total average transmitted power (e.g., in dBm), uplink total noise (e.g., in dBm), downlink/uplink load factor (e.g., in percentage), uplink interference noise rise (e.g., in dB), number of downlink/uplink radio links used, connection success rate (e.g., in percentage), average number of attempted users, average number of connected users, average number of used codes, ratio of handoff (e.g., in percentage), connection success, downlink/uplink throughput (e.g., in kbps), etc. In some embodiments, the KPIs can include cell level KPIs (e.g., statistics associated with handover and neighbor list as listed above), user equipment level KPIs (e.g., a signal strength indicator for a wireless communication device), as well as system level KPIs (e.g., number of connected users across the network).

In some embodiments, the set of values and/or indicators can include a network statistic representing the capacity of the wireless network 100. In some embodiments, such a capacity can be measured, for example, by a total number of calls, an amount of delivered data in bits and/or a throughput (e.g., overall data rate) in case of data calls.

In some embodiments, the set of values and/or indicators can include a number of handovers of end-user equipments (i.e., wireless communication devices) that are transitioning between different serving sectors (i.e., coverage areas). Specifically, each active user equipment is associated with one or more serving sectors. As the user equipment moves between the coverage areas of different antennas, the serving sectors associated with the user equipment can potentially change due to, for example, a new serving sector having a better signal quality than an existing serving sector associated with the user equipment. Particularly, in a soft handover, the user equipment can be associated with more than one serving sector at the same time because the signal quality of the different serving sectors is similar. In some embodiments, the number of handovers between different serving sectors can be used as an indicator of how close those serving sectors are to each other, and/or an indicator of the dependency between those different serving sectors.

In some embodiments, the set of values and/or indicators can include a neighbor list, which includes a list of potential neighbors (i.e., neighbor serving sectors) for a user equipment (i.e., wireless communication device) in a given serving sector, and/or neighbor priorities of those potential neighbors. A potential neighbor for a user equipment can be a neighbor serving sector that can potentially provide services to that user equipment as part of a handover operation when the user equipment is traveling between different coverage areas. Each potential neighbor for a user equipment can be associated with a neighbor priority that indicates the priority (or likelihood) of the corresponding neighbor serving sector being selected to provide services to the user equipment. In some embodiments, such a neighbor priority can be determined based on, for example, a measurement (e.g., signal strength, distance to a base station) associated with the quality of the services that can be potentially provided to the user equipment if the corresponding neighbor serving sector is selected. In some embodiments, multiple neighbor lists of the serving sectors that are currently serving the user equipment can be combined to define a single neighbor list to be sent to the user equipment. In such embodiments, the user equipment can use this combined list to search for additional potential neighbors for handover operations.

The network optimization apparatus 101 can be any device configured to control and/or coordinate SON processes operated in the wireless network 100 by executing, for example, a SON manager. For example, in a highly congested network that is to be optimized in multiple aspects (e.g., load balancing, co-channel interference, neighbor list, handovers, self-healing, etc.), multiple SON processes and/or other optimization processes can be operated across the wireless network 100 at the same time. Many dependencies exist between different SON processes. Dependencies can also exist between metrics that are used in the different SON processes, and between configurations of network devices that operate the SON processes. In such embodiments, a SON manager can be executed (e.g., at a network optimization apparatus) to manage the simultaneous SON processes, as described in further details with respect to FIGS. 2-12. Additionally, a metric can be any configurable value associated with a network device (e.g., a base station) that executes a SON process. A metric can be, for example, antenna tilt, a number of cycles for a SON process, a parameter in a modulation scheme, and/or any other modifiable parameter used to optimize the network.

In some embodiments, the network optimization apparatus 101 can be, for example, a computer device, a server device, an application server, a mobile device, a workstation, and/or the like. As shown in FIG. 1, the network optimization apparatus 101 can be directly or operatively coupled to the remaining devices within the wireless network 100. Specifically, the network optimization apparatus 101 can be operatively coupled to the base stations (e.g., the base stations 142, 144 and 146) via one or multiple intermediate modules and/or devices such as, for example, a controller (e.g., the controllers 112, 114 and 116) and/or the like. In some embodiments, the network optimization apparatus 101 can be coupled to the remaining devices of the wireless network 100 via any suitable connecting mechanism such as, for example, optical connections (e.g., optical cables and optical connectors), electrical connections (e.g., electrical cables and electrical connectors), wireless connections (e.g., wireless transceivers and antennas), and/or the like. Furthermore, while shown in FIG. 1 as a single device, in some embodiments, the functionality of the network optimization apparatus 101 can be distributed to multiple devices across the wireless network 100.

Figure 2:
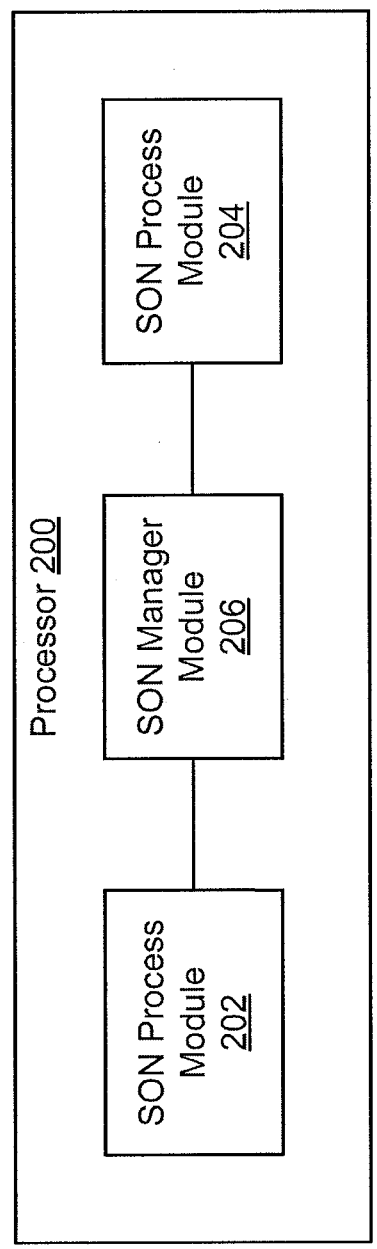
FIG. 2 is a block diagram of a processor of a network optimization apparatus in FIG. 1.

In some embodiments, the SON manager for managing the SON processes operated in the wireless network 100 can be executed at a processor of the network optimization apparatus 101. FIG. 2 is a block diagram of such a processor 200 of the network optimization apparatus 101. As shown in FIG. 2, the processor 200 includes a SON manager module 206 and separate SON process modules 202, 204. Although not shown in FIG. 2, in some embodiments, the processor 200 can include other modules and/or components associated with managing SON processes such as, for example, a monitor module, a detector module and/or the like. In some embodiments, the network optimization apparatus 101 can be a single physical device. In other embodiments, the network optimization apparatus 101 can include multiple physical devices, each of which can include one or multiple modules (shown in FIG. 2) and/or other components (not shown in FIG. 2) of the processor 200.

Each module in the processor 200 can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor 200) capable of performing one or more specific functions associated with that module. The processor 200 can be any suitable processor configured to run and/or execute those modules.

Each of the SON process modules in the processor 200 (e.g., the SON process modules 202 and 204) can be configured to execute one or more SON processes in the wireless network 100. In some embodiments, each SON process module in the processor 200 can be configured to execute, for example, an antenna-based SON process, a parameter-based SON process, and/or the like. In some embodiments, the combination of the SON process modules 202 and 204 can be, for example, a combination of a load balancing SON process module and an interference reduction SON process module, a combination of a load balancing SON process module and a neighbor list SON process module, a combination of a load balancing SON process module and a handover SON process module, a combination of a self-healing SON process module and an interference reduction SON process module, or any suitable combination of SON process modules. Furthermore, as shown in FIG. 2, the SON manager module 206 can act as a manager and/or intermediary between the SON process modules (e.g., the SON process modules 202 and 204) in the processor 200. As a result, the SON manager module 206 can be configured to manage the SON process modules such that the SON manager module 206 can control and coordinate the operations of the corresponding SON processes executed by those SON process modules.

Specifically, the SON manager module 206 can be configured to schedule different SON process modules by taking various actions. For example, the SON manager module 206 can be configured to start (e.g., initiate) and/or stop different SON processes. That is, the SON manager module 206 can decide or accept the starting of a SON process, and decide when to stop a SON process. For another example, the SON manager module 206 can be configured to pause and/or resume different SON processes. In some embodiments, the SON manager module 206 can pause a SON process until certain conditions are met; and after the conditions are met, the SON manager module 206 can resume that SON process. Additionally, the SON manager module 206 can be configured to choose to execute multiple SON processes in serial or parallel; prioritize different SON processes; determine a running time for a SON process; and/or the like.

In some embodiments, the SON manager module 206 can be configured to transfer data and/or control signals (e.g., KPIs, messages, commands, etc.) between different SON process modules. In some embodiments, the SON manager module 206 can be configured to apply rules and/or policies to make modifications on the SON process modules, thus to control the corresponding SON processes.

In some embodiments, the SON manager module 206 can be configured to coordinate with different SON processes to harmonize modifications, which are generated during those SON processes, on network devices (e.g., base stations) operating the SON processes. Signals representing the harmonized modifications are then sent to the associated base stations for implementation. As such, the SON manager module 206 can be configured to check if any potential conflict exists between the modifications from the different SON processes before sending the signals to the associated base stations. If any potential conflict is determined, the SON manager module 206 can be configured to, for example, accept one of the modifications and suppress the others; send signals representing the potential conflict to the SON processes that are involved in the conflict and instruct the SON processes to recalculate their modification inputs; send signals representing the modification inputs of the other parties (e.g., the other SON processes) to the SON processes that are involved in the potential conflict and receive responses from the SON processes about the acceptability of the modification inputs of the other parties; and/or act as a communication link between the SON processes to enable the SON processes to send signals between each other.

While shown in FIG. 2 as being included in the processor 200 of the network optimization apparatus 101, in other embodiments, a SON manager module can communicate with the wireless network 100 via an application programming interface (API) of a network module and/or application, a network process, an intermediary device, and/or any other suitable means. Additionally, the SON manager module can receive network information (e.g., KPIs) from the network database 120 in any suitable format, such as, for example, text files, a file format associated with a network, and/or the like.

Returning to FIG. 1, the SON manager module 206 executed at the network optimization apparatus 101 can be configured to manage (e.g., schedule, coordinate) multiple SON processes operated in the wireless network 100. Specifically, the SON manager module 206 can be configured to collect or receive values of performance indicators (e.g., KPIs) and/or other information associated with the wireless network 100 (e.g., power indications, link connection information, configuration metric values, network metric values, etc.) from the network database 120. Based on the collected or received values of the performance indicators and/or information, the SON manager module 206 can be configured to optimize metric values (e.g., parameter values) that are used to control and configure SON processes. The metric values that can be modified by the SON manager module 206 include, for example, frequency band, number of carriers for a serving sector, service for each carrier, antenna gain, mechanical downtilt, electrical downtilt, power metric values associated with carriers (e.g., in dBm), etc.

The SON manager module 206 can then be configured to send each optimized value of the metrics to each corresponding SON process module (e.g., the SON process module 202, 204 in FIG. 2) executed at the network optimization apparatus 101. As a result, the SON process modules can be configured to implement the optimized values of the metrics, thus to modify the corresponding SON processes accordingly. In some embodiments, for example, the SON process modules can send signals to the base stations (e.g., the base stations 142, 144 and 146) via controllers (e.g., the controller 112, 114 and 116) such that configuration modifications (e.g., on antenna tilts) can be applied at the base stations (e.g., antenna tilts) based on the optimized metric values determined at the SON manager module 206. Although as described herein the SON manager module 206 is configured to optimize metric values, the resulted metric values may not always be optimal, but could be improved. In other words, the optimization process executed at the SON manager module 206 need not be perfect with respect to optimizing metric values for SON processes.

As a centralized controller over the multiple SON processes operating in the wireless network 100, the SON manager module 206 can be configured to manage the multiple SON processes in a cooperative manner such that conflicts between the multiple SON processes can be avoided, minimized or reduced. In some embodiments, for example, the SON manager module 206 can be configured to manage two SON processes (e.g., a load balancing SON process and an interference reduction SON process) operating in the wireless network 100, each of which can potentially modify a common metric (e.g., an antenna tilt). The SON manager module 206 can control the modifications on the common metric from the two SON processes such that a modification on the common metric from one of the two SON processes is not contradictory, or does not negatively affect, a modification on the common metric from the other of the two SON processes. For example, if the SON manager module 206 instructs one SON process to increase the metric value from an original value to a new value, the SON manager module 206 will not instruct the other SON process to decrease the metric value from the new value back to the original value. In such a manner, the SON manager module 206 can eliminate a ping-pong effect between the two SON processes attempting to modify a common metric. Thus, the centralized control pattern implemented at the SON manager module 206 can avoid, minimize or reduce contradictive operations by SON processes.

Figure 3:
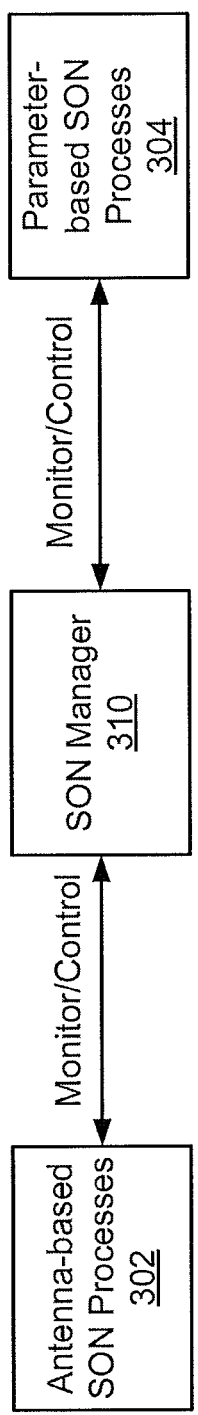
FIG. 3 is a schematic diagram that illustrates a SON manager configured to manage antenna-based SON processes and parameter-based SON processes, according to an embodiment.

In some embodiments, a SON manager can be configured to simultaneously manage various types of SON processes, including antenna-based SON processes and parameter-based SON processes to optimize values of various dependent metrics for solving one problem or achieving an optimization objective. Herein parameter-based SON processes are referred to as parameter-based SON processes that are not associated with antennas, that is, metrics modified by parameter-based SON processes are non-antenna metrics. FIG. 3 is a schematic diagram that illustrates a SON manager 310 configured to manage antenna-based SON processes 302 and parameter-based SON processes 304, according to an embodiment. The SON manager 310 can be structurally and functionally similar to the SON manager module 206 shown and described with respect to FIG. 2. Particularly, the SON manager 310 can be executed to manage SON processes for a wireless network similar to the wireless network 100 in FIG. 1.

As shown in FIG. 3, the SON manager 310 can manage, in parallel, the antenna-based SON processes 302 and the parameter-based SON processes 304 for achieving an optimization objective. That is, both SON processes can be executed at the same time and the SON manager 310 can monitor the effect of each SON process on the wireless network with respect to the optimization objective. Furthermore, the SON manager 310 can be configured to control (e.g., initiate/terminate, start/stop, pause/resume, etc.) each of the SON processes based on the result of monitoring the wireless network as well as the output of the SON processes.

In some instances, the actions of the SON manager 310 can depend on which SON processes are currently running, as well as the relations and/or dependencies between the different SON processes. For example, if two SON processes operating in a wireless network (e.g., the wireless network 100 in FIG. 1) are intended or designed to handle one problem or multiple closely-related problems, the SON manager 310 can be configured to manage the two SON processes in the following method: 1) first, the SON manager 310 can execute the first SON process; 2) the second SON process can be paused until the first SON process finishes one or more closed cycles without causing performance degradation to the wireless network; 3) after the closed cycles are finished, the first SON process can be paused and the second SON process can be executed for one or more closed cycles; 4) if the problem(s) is resolved at any time, the SON manager 310 can terminate the first SON process and the second SON process; 5) if the SON manager 310 detects that one of the two SON processes degrades or does not enhance the performance of the wireless network, the SON manager 310 can stop or pause that SON process and continue executing the other SON process; and 6) the SON manager 310 can decide to restart or resume the stopped or paused SON process later if the SON manager 310 detects that room exists for performance enhancement of the wireless network. In this example, the definition of a cycle can be as granular as a change of one metric with enough time to monitor the effect of the change. A cycle can also be large enough to include changes of multiple metrics and/or multiple changes of one metric. In addition to the method described above, the SON manager 310 can choose which SON process is to be executed on which network device (e.g., a network optimization apparatus, a controller, a base station, etc.), and when to execute that SON process.

Figure 4:
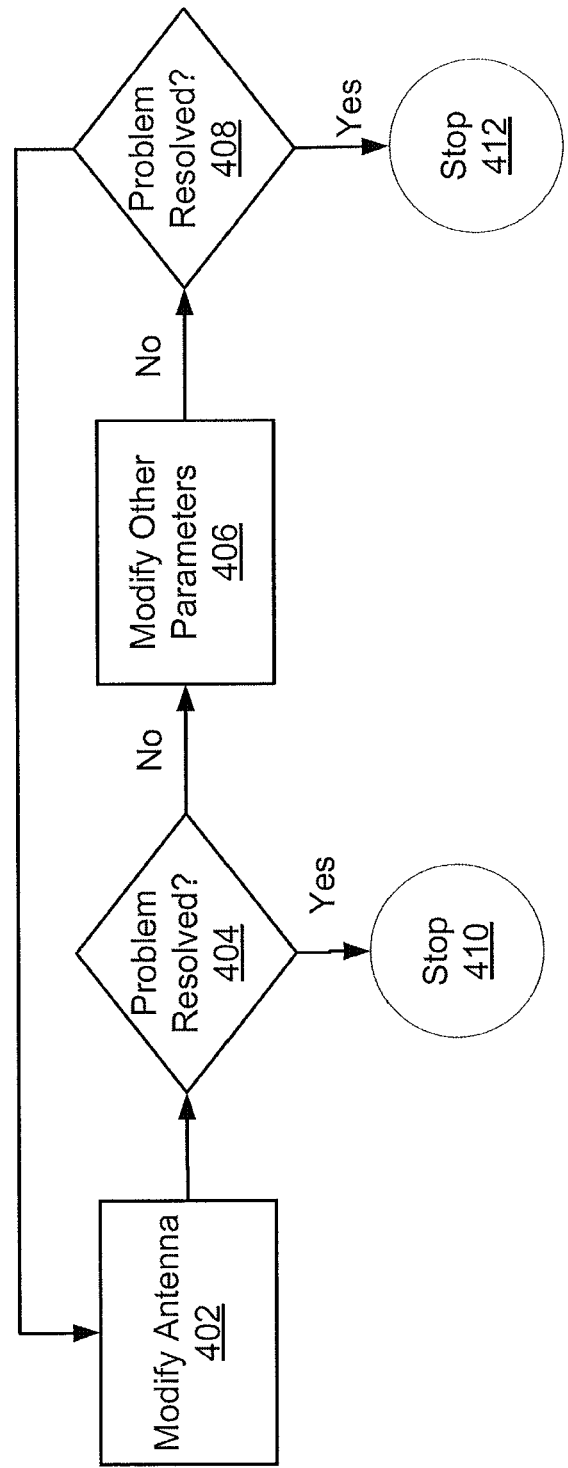
FIG. 4 is a flow chart illustrating a method for managing antenna-based SON processes and parameter-based SON processes to resolve a problem, according to an embodiment.

FIG. 4 is a flow chart illustrating a method (e.g., an optimization process) for managing an antenna-based SON process and a parameter-based SON process to resolve a problem (e.g., achieve an optimization objective), according to an embodiment. The method can be executed at a SON manager within a wireless network similar to the SON manager module 206 in FIG. 2 or the SON manager 310 in FIG. 3. The SON manager can be configured to manage an antenna-based SON process and a parameter-based SON process to resolve a problem such as, for example, load balancing, as follows.

At 402, the SON manager can be configured to execute the antenna-based SON process to modify antenna metric values to resolve the problem (e.g., load balancing). The antenna metric values can be associated with, for example, the antenna tilts. After one or a predetermined number of cycles of executing the antenna-based SON process (e.g., modify each antenna metric value to a new value) are completed, at 404, the SON manager can check whether the problem has been resolved or not. If the problem has been resolved, at 410, the SON manager can terminate the optimization process. Otherwise, if the problem has not been resolved, at 406, the SON manager can pause the antenna-based SON process and execute the parameter-based SON process (e.g., a handover (HO) parameter-based load balancing SON process) to modify other metric values that are not associated with the antenna. After one or a predetermined number of cycles of executing the parameter-based SON process (e.g., modify each of the other metric values to a new value) are completed, at 408, the SON manager can check whether the problem has been resolved or not. If the problem has been resolved, at 412, the SON manager can terminate the optimization process. Otherwise, if the problem has not been resolved, the SON manger can iterate the optimization process by repeating the steps 402-408 as illustrated in FIG. 4.

In the optimization process illustrated in FIG. 4 and described above, in some embodiments, each cycle in a step (e.g., the step 402 or 406) can contain one or more optimization cycles (e.g., iterations) for executing the SON processes. Additionally, after each modification on antenna metric values or other metric values during the optimization process, the SON manager can check whether the modification has degraded the performance of the wireless network or not. If any modification has degraded the performance of the wireless network, such modification can be reversed, and/or the corresponding SON process (the antenna-based SON process or the parameter-based SON process) that caused the modification can be terminated and will not be reused.

Figure 6:
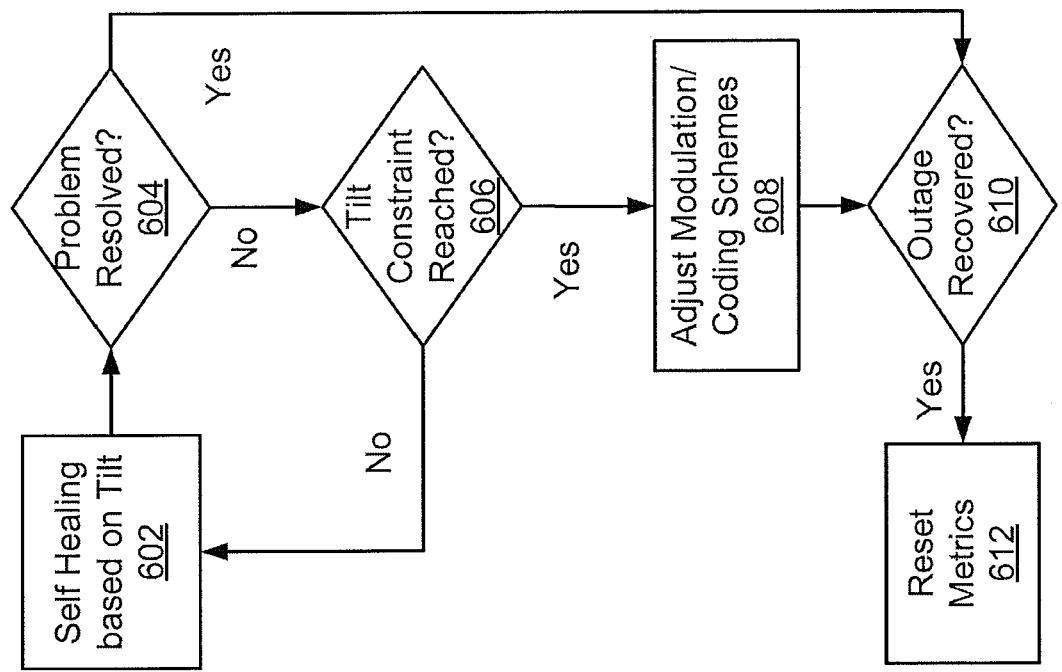
FIG. 6 is a flow chart illustrating a method for managing an antenna-based SON process and a parameter-based SON processes to optimize self-healing, according to an embodiment.
Figure 5:
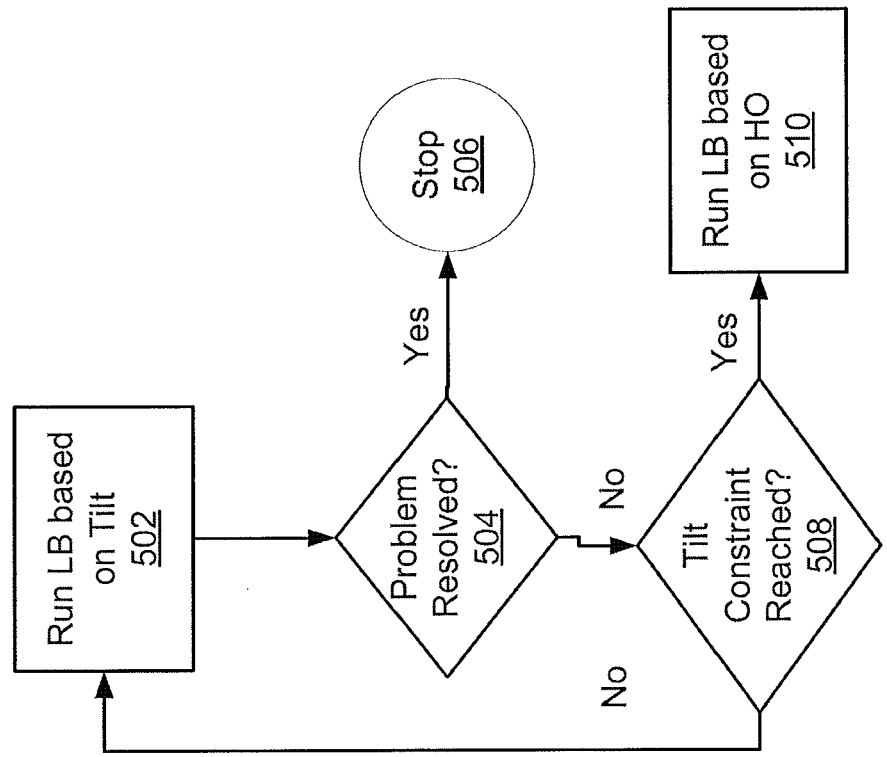
FIG. 5 is a flow chart illustrating a method for managing an antenna-based SON process and a parameter-based SON process to optimize load balancing, according to an embodiment.

FIGS. 5 and 6 illustrate examples of executing a SON manager to manage antenna-based SON processes and parameter-based SON processes to achieve a common optimization objective (e.g., load balancing, interference reduction, self-healing, etc.) in a wireless network. FIG. 5 is a flow chart illustrating a method for managing an antenna-based SON process and a parameter-based SON process to optimize load balancing (LB), according to an embodiment. Specifically, a SON manager (similar to the SON manager module 206 in FIG. 2 or the SON manager 310 in FIG. 3) can coordinate optimization of antenna metric values (e.g., antenna tilts) and other metric values (e.g., handover metric values) by managing an antenna-based SON process (e.g., an antenna-based load balancing SON process) and a parameter-based SON process (e.g., a handover-based load balancing SON process) operated in a wireless network. As a result, an optimization process for load balancing can be completed for the wireless network.

At 502, the SON manager can execute the antenna-based load balancing SON process to optimize load balancing by modifying antenna metric values (e.g., antenna tilts). After one or a predetermined number of cycles of executing the antenna-based load balancing SON process are completed, at 504, the SON manager can check whether the problem (i.e., optimization of load balancing) has been resolved or not. If the problem has been resolved, at 506, the SON manager can terminate the optimization process. Otherwise, if the problem has not been resolved, at 508, the SON manager can check whether a tilt constraint associated with the antenna has been reached or not. If the tilt constraint has not been reached, the SON manager can continue executing the antenna-based load balancing SON process by repeating the steps 502-508. Otherwise, if the tilt constraint has been reached, at 510, the SON manager can stop the antenna-based load balancing SON process and execute the handover-based load balancing SON process to optimize load balancing by modifying handover metric values, until the optimization of load balancing is completed.

Similar to the example illustrated in FIG. 5, FIG. 6 is a flow chart illustrating a method for managing an antenna-based SON process and a parameter-based SON process to optimize self-healing, according to an embodiment. Specifically, a SON manager (similar to the SON manager module 206 in FIG. 2 or the SON manager 310 in FIG. 3) can coordinate optimization of antenna metric values (e.g., antenna tilts) and other metric values (e.g., metric values associated with modulation and/or coding schemes) by managing an antenna-based SON process (e.g., an antenna-based self-healing SON process) and a parameter-based SON process (e.g., a parameter-based SON process for adjusting modulation and/or coding schemes) operated in a wireless network. As a result, a self-healing process can be completed for the wireless network to recover from an outage.

At 602, the SON manager can execute the antenna-based self-healing SON process to achieve self-healing by modifying antenna metric values (e.g., antenna tilts). After one or a predetermined number of cycles of executing the antenna-based self-healing SON process are completed, at 604, the SON manager can check whether the problem has been resolved (i.e., the outage has been recovered) or not. If the problem has been resolved, at 610, the SON manager can check whether the outage has been recovered, and if the outage has been recovered, corresponding metrics of the wireless network (e.g., antenna tilts, metric values associated with modulation and/or coding schemes) can be reset at 612. Otherwise, if the problem has not been resolved, at 606, the SON manager can check whether a tilt constraint associated with the antenna has been reached or not. If the tilt constraint has not been reached, the SON manager can continue executing the antenna-based self-healing SON process by repeating the steps 602-606. Otherwise, if the tilt constraint has been reached, at 608, the SON manager can stop the antenna-based self-healing SON process and execute the parameter-based SON process for adjusting modulation and/or coding schemes. Specifically, the SON manager can be configured to execute the parameter-based SON process to achieve self-healing by modifying metric values associated with modulation and/or coding schemes. When the parameter-based SON process is executed, at 610, the SON manger can regularly check whether the outage has been recovered, and if the outage has been recovered, the self-healing process is completed and corresponding metrics of the wireless network can be reset at 612.

In the examples of FIGS. 5 and 6, the tilt-based mechanism (e.g., the antenna-based load balancing SON process, the antenna-based self-healing SON process) is desirable over the parameter-based mechanism (e.g., the handover-based load balancing SON process, the SON process for adjusting modulation and/or coding schemes) because the tilt-based mechanism can achieve coverage and capacity optimization by directly modifying the coverage boundaries, while the parameter-based mechanism for the same optimization objective (e.g., load balancing, self-healing) virtually modifies coverage boundaries and may cause qualify of service (QoS) issues. On the other hand, the tilt-based mechanism may be limited due to uptilt restrictions or lack of cell breathing. Thus, the parameter-based optimization (e.g., the handover-based load balancing optimization, the modulation and/or coding schemes-based self-healing) and the tilt-based optimization (e.g., the tilt-based load balancing optimization, the tilt-based self-healing) can be combined as illustrated in FIGS. 5 and 6. Additionally, other considerations (e.g., complexity of modifying a metric value, potential negative impact on other network devices) may be used to set up the SON manger policies regarding coordination between the tilt-based SON process and the parameter-based SON process.

In some embodiments, a SON manager can be configured to coordinate multiple SON processes with different optimization objectives (e.g., load balancing, self-healing, interference reduction, neighbor relations, etc.), where the multiple SON processes are associated with a common set of metrics (e.g., antenna tilts, non-antenna metrics). Execution of those multiple SON processes can depend on the set of metrics (e.g., use part or all of the metrics as an input to the execution), and/or affect the set of metrics (e.g., modify part or all of the metrics as a result of the execution). Thus, the SON manager coordinate the execution of the multiple SON processes such that execution of one SON process will not adversely affect execution of another SON process.

For example, three SON processes operated in a wireless network with different optimization objectives as load balancing, self-healing or interference reduction can all use antenna tilts as a metric to adjust the antennas to meet their corresponding optimization objectives. Because tilt changes made to meet one of the three optimization objectives may be contrary to the other optimization objectives, the three SON processes can be coordinated by the SON manager. In addition, tilt changes made to meet these collective optimization objectives may negatively affect cell neighbor relations, which in turn can negatively affect, for example, the handover performance of the wireless network. Hence, the SON manager also can coordinate the optimization objectives with an Automatic Neighbor Relations (ANR) update.

Figure 8:
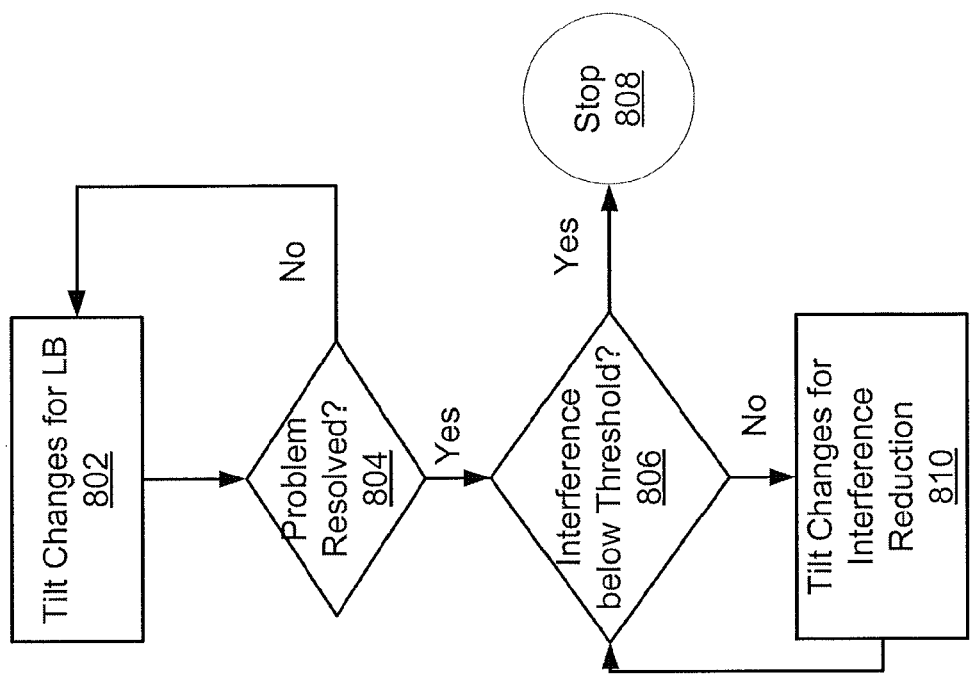
FIG. 8 is a flow chart illustrating a method for coordinating antenna-based SON processes for jointly optimizing load balancing and interference reduction, according to an embodiment.
Figure 7:
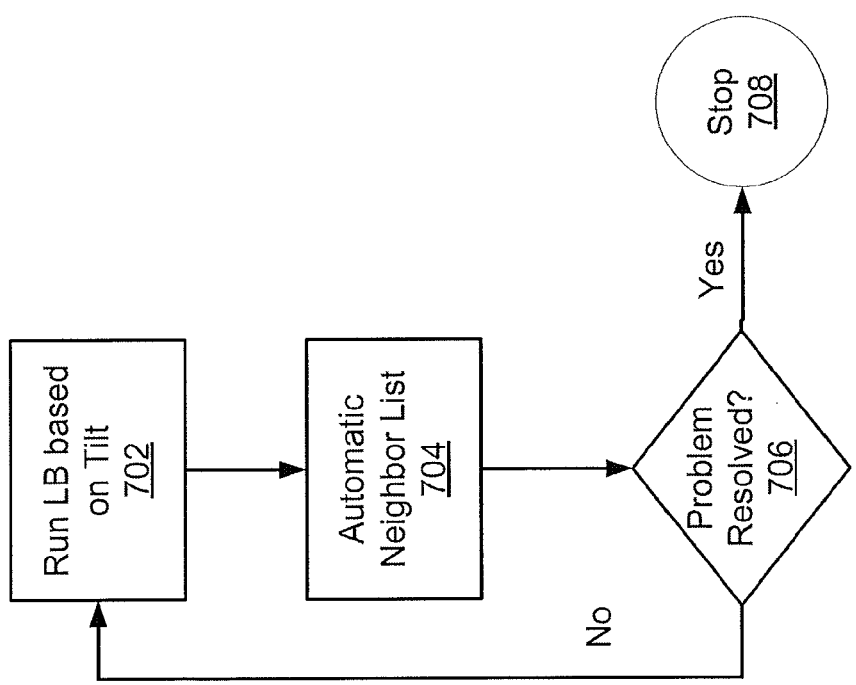
FIG. 7 is a flow chart illustrating a method for coordinating antenna-based SON processes for jointly optimizing load balancing and neighbor relations, according to an embodiment.

FIGS. 7 and 8 illustrate examples of executing a SON manager to coordinate multiple SON processes with different optimization objectives. FIG. 7 is a flow chart illustrating a method for coordinating antenna-based SON processes for jointly optimizing load balancing and neighbor relations, according to an embodiment. Specifically, a SON manager (similar to the SON manager module 206 in FIG. 2 or the SON manager 310 in FIG. 3) can coordinate an antenna-based load balancing SON process and an ANR SON process, which are operated in a wireless network, to jointly optimize the optimization objectives of load balancing and neighbor relations for the wireless network.

At 702, the SON manager can be configured to execute the antenna-based load balancing SON process to optimize load balancing by modifying antenna metric values (e.g., antenna tilts). After one or a predetermined number of cycles of executing the antenna-based load balancing SON process are completed, at 704, the SON manager can be configured to execute the ANR SON process to adjust any neighbor relation that is affected by the changes (e.g., tilt changes) made in the previous step 702. After one or a predetermined number of cycles of executing the ANR SON process are completed, at 706, the SON manager can check whether the problem (i.e., optimization of load balancing and/or neighbor relations) has been resolved or not. If the problem has been resolved, at 708, the SON manager can stop the ANR SON process. Otherwise, if the problem has not been resolved, the SON manager can continue executing the antenna-based load balancing SON process and the ANR SON process by repeating the steps 702-706, as illustrated in FIG. 7.

Similar to the example of FIG. 7, FIG. 8 is a flow chart illustrating a method for coordinating antenna-based SON processes for jointly optimizing load balancing and interference reduction, according to an embodiment. Specifically, a SON manager (similar to the SON manager module 206 in FIG. 2 or the SON manager 310 in FIG. 3) can coordinate an antenna-based load balancing SON process and an interference reduction SON process, which are operated in a wireless network, to jointly optimize the optimization objectives of load balancing and interference reduction for the wireless network.

At 802, the SON manager can be configured to execute the antenna-based load balancing SON process to optimize load balancing by modifying antenna metric values (e.g., antenna tilts). After one or a predetermined number of cycles of executing the antenna-based load balancing SON process are completed, at 804, the SON manager can check whether the problem (i.e., load balancing) has been resolved or not. If the problem has not been resolved, the SON manager can continue executing the antenna-based load balancing SON process by repeating the step 802, as illustrated in FIG. 8. Otherwise, if the problem has been resolved, at 806, the SON manager can conduct an interference check to determine whether the resulted interference level is below a predetermined threshold on interference or not. If the resulted interference level is below the predetermined threshold, at 808, the SON manager can stop the optimization process. Otherwise, if the resulted interference level is above the predetermined threshold, at 810, the SON manager can be configured to execute the interference reduction SON process to reduce the interference level for the wireless network. As illustrated in FIG. 8, the SON manager can continue executing the interference reduction SON process (i.e., repeat the step 806) until the resulted interference level is below the predetermine threshold.

In some embodiments, the SON processes operated in the example of FIG. 7 or the example of FIG. 8 can be interchanged or arranged in any suitable manner. For example, in FIG. 8, instead of being executed at the end of a predetermined number of cycles (or iterations) of the antenna-based load balancing SON process, the interference check and the resulted interference reduction SON process (if necessary) can be executed after each cycle (or iteration) of the antenna-based load balancing SON process. For another example, in FIG. 7, the ANR SON process can be executed at every iterative step of the antenna-based load balancing SON process or after the antenna-based load balancing SON process is completed. Additionally, other considerations (e.g., traffic load and resource availability at the network devices operating the SON processes) may be used to set up the SON manager policies regarding coordination between multiple SON processes to achieve interoperability of different optimization objectives.

Figure 9:
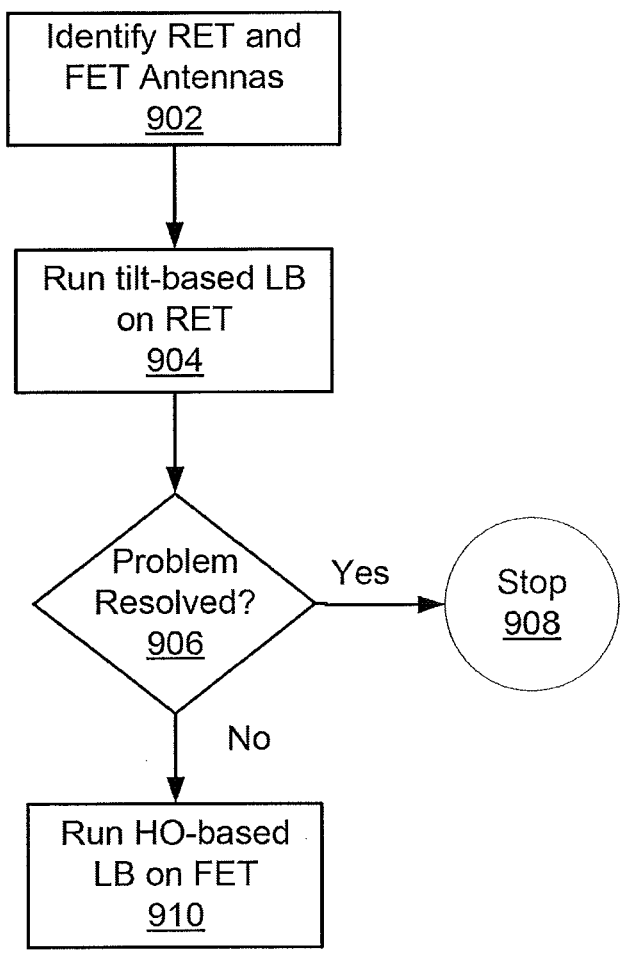
FIG. 9 is a flow chart illustrating a method for managing an antenna-based SON process and a parameter-based SON process in a heterogeneous network, according to an embodiment.

In some embodiments, a SON manager can be configured to manage which elements (e.g., metrics) each SON process should handle. As an example, FIG. 9 is a flow chart illustrating a method for managing an antenna-based SON process and a parameter-based SON process in a heterogeneous network, according to an embodiment. In such a heterogeneous network, both Remote Electrical Tilt (RET) antennas and Fixed Electrical Tilt (FET) antennas are installed. At 902, a SON manager in a wireless network can identify RET antennas and FET antennas installed within that wireless network. At 904, the SON manager can execute an antenna-based load balancing SON process on the RET antennas to optimize load balancing by modifying antenna tilts of the RET antennas. After the antenna-based load balancing SON process is completed on the RET antennas, at 906, the SON manager can check whether the problem (i.e., optimization of load balancing) has been resolved or not. If the problem has been resolved, at 908, the SON manager can terminate the optimization process. Otherwise, if the problem has not been resolved (in other words, if additional optimization is needed or preferred), at 910, the SON manager can execute a handover-based load balancing SON process on the FET antennas to further optimize load balancing by modifying metric values (i.e., non-tilt metric values) of the FET antennas.

In some embodiments, a SON manager can be configured to manage multiple SON processes with different granularities. As an example, FIGS. 10A and 10B are logical representations of a series of operations by a SON manager with different granularities, according to an embodiment.

Figure 10A:
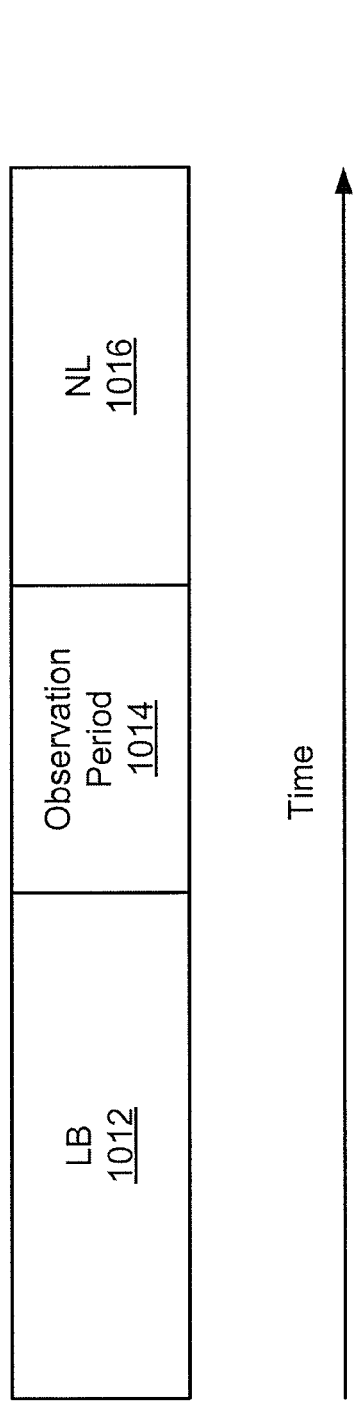
FIGS. 10A and 10B are logical representations of a series of operations by a SON manager with different granularities, according to an embodiment.

In FIG. 10A, a SON manager can manage a load balancing SON process (e.g., an antenna-based load balancing SON process) and a neighbor list SON process, which are operated in a wireless network (e.g., the wireless network 100 in FIG. 1), with a relatively lower granularity. Specifically, the SON manager can be configured to execute the load balancing SON process (e.g., during the period 902 in FIG. 9) based on, for example, one or more KPIs received from other devices of the wireless network (e.g., during a previous observation period not shown in FIG. 10A) and/or one or more metric values stored in a network database (e.g., the network database 120 in FIG. 1) of the wireless network. Furthermore, the SON manager can instruct the load balancing SON process to continue execution during the period 1012 until it is completed. After the load balancing SON process is completed and any modified metric value is stored (e.g., in the network database), the SON manager can observe the effects of the load balancing SON process on the wireless network in an observation period 1014. For example, the SON manager can receive KPIs from other devices of the wireless network during the observation period 1014. After the observation period 1014, the SON manager can execute the neighbor list SON process during a period 1016. Particularly, the SON manager can be configured to execute the neighbor list SON process based on, for example, one or more KPIs received from other devices of the wireless network and/or one or more metric values stored in the network database during the observation period 1014 and the period 1012. As a result, one or more KPIs and/or metric values used by the neighbor list SON process executed during the period 1016 can be updated or modified by the load balancing SON process executed during the period 1012.

Figure 10B:
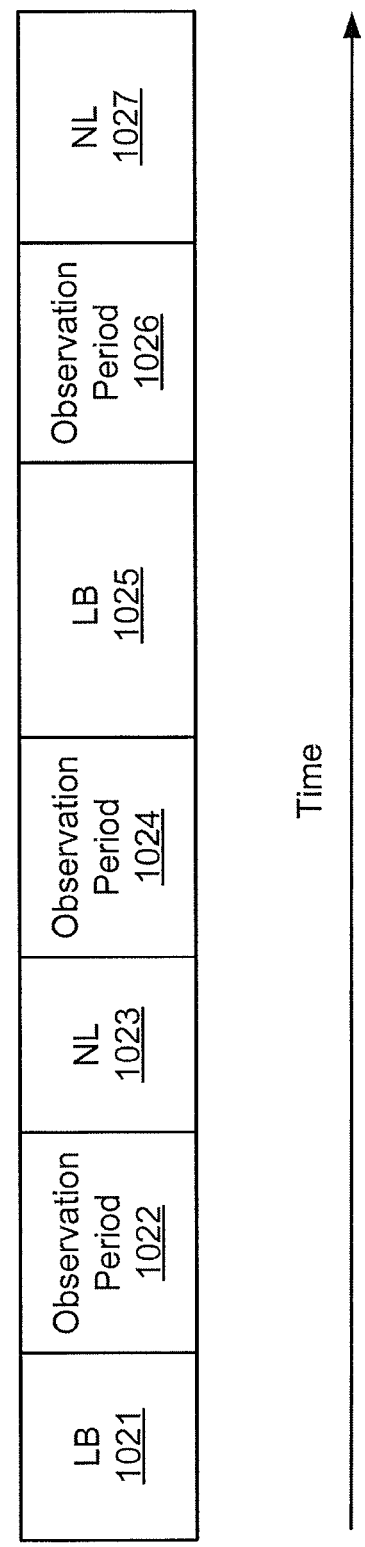

In FIG. 10B, a SON manager can manage a load balancing SON process (e.g., an antenna-based load balancing SON process) and a neighbor list SON process, which are operated in a wireless network (e.g., the wireless network 100 in FIG. 1), with a relatively higher granularity. Different from the process shown and described above with respect to FIG. 10A, the load balancing SON process and the neighbor list SON process can each be split into multiple (e.g., two as shown in FIG. 10B, or more than two) phases. After each phase of the load balancing SON process, a phase of the neighbor list SON process can be executed.

Specifically, during a period 1021, the SON manager can execute a first phase of the load balancing SON process based on, for example, one or more KPIs received from other devices of the wireless network (e.g., during a previous observation period not shown in FIG. 10B) and/or one or more metric values stored in a network database (e.g., the network database 120 in FIG. 1) of the wireless network. After the first phase of the load balancing SON process is completed and any modified metric value is stored (e.g., in the network database), the SON manager can observe the effects of the first phase of the load balancing SON process on the wireless network in a first observation period 1022. For example, the SON manager can receive KPIs from other devices of the wireless network during the observation period 1022. After the first observation period 1022, the SON manager can be configured to execute a first phase of the neighbor list SON process during a period 1023. Particularly, the SON manager can be configured to execute the first phase of the neighbor list SON process based on, for example, one or more KPIs received from other devices of the wireless network and/or one or more metric values stored in the network database during the first observation period 1022 and the period 1021. As a result, one or more KPIs and/or metric values used by the first phase of the neighbor list SON process executed during the period 1023 can be updated or modified by the first phase of the load balancing SON process executed during the period 1021.

After the first phase of the neighbor list SON process is completed and any modified metric value is stored, the SON manager can be configured to observe the effects of the first phase of the neighbor list SON process on the wireless network in a second observation period 1024. After the second observation period 1024, the SON manager can execute a second phase of the load balancing SON process during a period 1025. Particularly, the SON manager can execute the second phase of the load balancing SON process based on, for example, one or more KPIs received from other devices of the wireless network and/or one or more metric values stored in the network database during the second observation period 1024 and the period 1023. As a result, one or more KPIs and/or metric values used by the second phase of the load balancing SON process executed during the period 1025 can be updated or modified by the first phase of the neighbor list SON process executed during the period 1023. Similarly, a third observation period 1026 and a second phase of the neighbor list SON process during a period 1027 can be sequentially executed. In such an iterative manner, the SON manager can manage different interleaved SON processes to incrementally optimize the wireless network in terms of multiple optimization objectives.

Compared to the method with the relatively lower granularity illustrated in FIG. 10A, the method with the relatively higher granularity illustrated in FIG. 10B can typically take a longer time to reach the final solution because the method includes more iterations. On the other hand, the method with the relatively higher granularity can typically provide a more optimal solution than that with the relatively lower granularity. Additionally, although shown in FIG. 10B as the load balancing SON process and the neighbor list SON process being split into two phases, in other embodiments, a SON process can be split into more than two or any number of phases. Furthermore, a SON process split into more phases generally can typically result in a more optimal solution.

FIG. 11 is a flow chart illustrating a method 1100 for optimizing a metric value associated with multiple optimization objectives, according to an embodiment. The method 1100 can be executed at, for example, a SON manager of a wireless network, such as the SON manager module 206 and the SON manager 310 shown and described with respect to FIGS. 1-3. The multiple optimization objectives can include, for example, load balancing, self-healing, interference reduction, ANL, and/or the like.

At 1102, the SON manager can be configured to receive a signal associated with a value of a performance indicator that a first process module is configured to optimize using a first metric. In some embodiments, the first process module can be, for example, a load balancing SON process module, a self-healing SON process module, an interference reduction SON process module, an ANL SON process module, and/or the like. In some embodiments, the performance indicator can be, for example, a KPI.

In some embodiments, the first process module can be an antenna-based SON process module. In such embodiments, the first metric can be a metric associated with an antenna, such as a tilt of an antenna. In other embodiments, the first process module can be a parameter-based (i.e., non-antenna) SON process module. In such embodiments, the first metric can be a non-antenna metric such as a number of cycles associated with the first process module.

At 1104, the SON manager can be configured to optimize a value associated with the first metric based on the value of the performance indicator that the first process module is configured to optimize, a value of a performance indicator that a second process module is configured to optimize using the first metric, and/or a value of a second metric used to optimize the performance indicator that the first process module is configured to optimize. Similar to the first process module, the second process module can be an antenna-based SON process module or a parameter-based SON process module. The second process module can be, for example, a load balancing SON process module, a self-healing SON process module, an interference reduction SON process module, an ANL SON process module, and/or the like. In some embodiments, the value associated with the first metric can be a value to which to change the value of the first metric.

At 1106, the SON manager can send a signal to the first process module including the value associated with the first metric such that the first process module modifies a value of the first metric based on the value associated with the first metric. In some embodiments, the signal can include the value of the second metric.

Furthermore, in some embodiments, the SON manager can receive a signal associated with a second value of the performance indicator that the second process module is configured to optimize. In response to the signal, the SON manager can optimize a second value associated with the first metric based on the value of the performance indicator that the first process module is configured to optimize, and the second value of the performance indicator that the second process module is configured to optimize. The SON manager can further send a signal to the second process module such that the second process module modifies the value of the first metric based on the second value associated with the first metric.

FIG. 12 is a flow chart illustrating a method 1200 for optimizing multiple metric values associated with a common optimization objective, according to an embodiment. Similar to the method 1100 described with respect to FIG. 11, the method 1200 can be executed at, for example, a SON manager of a wireless network, such as the SON manager module 206 and the SON manager 310 shown and described with respect to FIGS. 1-3. The multiple metrics can include antenna metrics (e.g., antenna tilts) and/or non-antenna metrics (e.g., metrics associated with modulation and/or coding schemes). The common optimization objective can be, for example, load balancing, self-healing, interference reduction, ANL, etc.

At 1202, the SON manager can be configured to receive a signal associated with a value of a performance indicator that a first process module is configured to optimize using a first metric and a second process module is configured to optimize using a second metric. The first process module and the second process module can be an antenna-based SON process module and/or a parameter-based SON process module. In some embodiments, the first process module and the second process module can be, for example, a load balancing SON process module, a self-healing SON process module, an interference reduction SON process module, an ANL SON process module, and/or the like.

At 1204, the SON manager can be configured to optimize a value associated with the first metric and a value associated with the second metric based on the value of the performance indicator. In some embodiments, the value associated with the first metric or the second metric can be a value to which to change the value of the first metric or the second metric.

At 1206, the SON manager can be configured to send a signal to the first process module such that the first process module modifies a value of the first metric based on the value associated with the first metric. Meanwhile, in some embodiments, the SON manager can be configured to send the value of the second metric to the first process module, such that the first process module modifies the value of the first metric based on the value of the second metric as well.

At 1208, similar to the step 1207, the SON manager can send a signal to the second process module such that the second process module modifies a value of the second metric based on the value associated with the second metric. In some embodiments, the SON manager can send the signals to the first process module and the second process module at substantially the same time. In other embodiments, the SON manager can send the signals to the first process module and the second process module at different times.

In some embodiments, the value of the performance indicator is a value of the performance indicator at a first time. The SON manager can send the signal to the first process module at a second time after the first time. The SON manager can then be configured to receive a signal associated with a second value of the performance indicator at a third time after the second time. As a result, the SON manager can be configured to optimize the value associated with the second metric based on the value of the performance indicator at the first time and the value of the performance indicator at the third time.

While shown and described herein as the SON manager being implemented in a wireless network, in other embodiments, a SON manager can also be implemented in other types of networks such as a wired network or a hybrid wireless-wired network. In such embodiments, the SON manager does not necessarily manage antenna-based SON processes or coordinate between antenna-based SON processes and parameter-based SON processes. Instead, the SON manager may manage and coordinate between different types of parameter-based SON processes in a similar method as described herein.

While shown and described herein as a SON process module being an antenna-based SON process module or a parameter-based SON process module, in other embodiments, a SON process module can be a combined antenna- and parameter-based SON process module. Such a combined SON process module can control a SON process where both antenna metric values (e.g., antenna tilts) and non-antenna metric values (e.g., parameters in a modulation scheme) can be modified.

While shown and described with respect to FIGS. 4-9 as a SON manager of a SON network that stops executing one or more SON processes after a problem is resolved (e.g., an outage is recovered, load balancing is achieved), in some embodiments, the SON manager does not stop monitoring the SON network. When a new problem is detected, the SON manager can be configured to automatically initiate one or more corresponding SON process(es) to handle the new problem. In other words, the methods described with respect to FIGS. 4-9 can be automatically and/or repeatedly (or continuously) performed in the SON network. Thus, automatic and continuous self-healing can be enabled for the SON network.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Where methods described above indicate certain events occurring in certain order, the ordering of certain events may be modified. Additionally, certain of the events may be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus comprising:
a memory configured to store instructions; and
a processor configured to execute the instructions to:
manage, concurrently, an antenna-based process and a parameter-based process;
receive a signal associated with a value of a performance indicator that a first device optimizes using a first metric and the antenna-based process,
the value being associated with at least one of a key performance indicator, a mobile level measurement, a cell level measurement, a system level measurement, a network metric, a configuration metric, a power indicator, or a network alarm indicator;

optimize a first value associated with the first metric based on the value of the performance indicator that the first device optimizes and a value of a performance indicator that a second device optimizes using the first metric and the parameter-based process;

send, at a first time, a signal to the first device to modify a value of the first metric based on the first value associated with the first metric; and receive, at a second time after the first time, a signal associated with a second value of the performance indicator that the second device optimizes.

2. The apparatus of claim 1, wherein the first device is: an antenna-based Self Organizing Network (SON) device.

3. The apparatus of claim 1, wherein the first metric is associated with a tilt of an antenna.

4. The apparatus of claim 1, wherein the second device is a load balancing SON device or an interference reduction SON device.

5. The apparatus of claim 1, wherein the value of the performance indicator that the second device optimizes is a first value of the performance indicator that the second device optimizes, and the processor is further configured to:

optimize a second value associated with the first metric based on the value of the performance indicator that the first device optimizes and the second value of the performance indicator that the second device optimizes; and send a signal to the second device to modify the value of the first metric based on the second value associated with the first metric.

6. The apparatus of claim 1, wherein the first value associated with the first metric is a quantity of cycles associated with executing the antenna-based process.

7. The apparatus of claim 1, wherein the processor is further configured to:

optimize the first value associated with the first metric based on a value of a second metric used to optimize the performance indicator that the first device optimizes.

8. A non-transitory processor-readable medium storing instructions, the instructions comprising:

one or more instructions which, when executed by a processor of a device, cause the processor to:

manage, concurrently, an antenna-based process and a parameter-based process;

receive a signal associated with a value of a performance indicator that a first device optimizes using a first metric and the antenna-based process, the value being associated with at least one of a key performance indicator, a mobile level measurement, a cell level measurement, a system level measurement, a network metric, a configuration metric, a power indicator, or a network alarm indicator;

optimize a first value associated with the first metric based on the value of the performance indicator that the first device optimizes, a value of a performance indicator that a second device optimizes using the first metric and the parameter-based process, and a value of a second metric used to optimize the performance indicator that the first device optimizes, the second metric being different from the first metric;

send, at a first time, a signal to the first device including the first value associated with the first metric and the value of the second metric; and receive, at a second time after the first time, a signal associated with a second value of the performance indicator that the second device optimizes.

9. The non-transitory processor-readable medium of claim 8, wherein the first device is:

an antenna-based Self Organizing Network (SON) device.

10. The non-transitory processor-readable medium of claim 8, wherein the first metric is associated with a tilt of an antenna.

11. The non-transitory processor-readable medium of claim 8, wherein the second device is a load balancing SON device or an interference reduction SON device.

12. An method comprising:

concurrently managing, by a device, an antenna-based process and a parameter-based process;

receiving, by the device, a signal associated with a value of a performance indicator that a first device optimizes using a first metric and the antenna-based process and a second device optimizes using a second metric and the parameter-based process, the value being associated with at least one of a key performance indicator, a mobile level measurement, a cell level measurement, a system level measurement, a network metric, a configuration metric, a power indicator, or a network alarm indicator;

optimizing, by the device, a first value associated with the first metric and a value associated with the second metric based on the value of the performance indicator;

sending, by the device and at a first time, a signal to the first device to modify the first value associated with the first metric;

sending, by the device, a signal to the second device to modify the value associated with the second metric; and receiving, by the device and at a second time after the first time, a signal associated with a second value of the performance indicator that the second device optimizes.

13. The method of claim 12, further comprising:

optimizing the value associated with the second metric at a third time after the first time.

14. The method of claim 12, further comprising:

sending the signal to the first device at a particular time; and sending the signal to the second device at substantially the particular time.

15. The method of claim 12, wherein the value of the performance indicator is a value of the performance indicator at a particular time, and the method further includes:

sending the signal to the first device at another time after the particular time;

receiving a signal associated with a value of the performance indicator at an additional time after the other time; and optimizing the value associated with the second metric based on the value of the performance indicator at the particular time and the value of the performance indicator at the additional time.

16. The method of claim 12, further comprising:

sending a value of a change in the second metric to the first device.

17. The method of claim 12, wherein the first device is an antenna-based Self Organizing Network (SON) device.

18. The method of claim 12, wherein the first metric is associated with a tilt of an antenna.

19. The method of claim 12, wherein the second device is a load balancing SON device or an interference reduction SON device.

20. The method of claim 12, wherein the first value associated with the first metric is a quantity of cycles associated with executing the antenna-based process.

* * * * *